United States Patent [19]
Crawford

[11] 4,177,825
[45] Dec. 11, 1979

[54] SELF-GRINDING VALVE MECHANISM
[75] Inventor: Millard B. Crawford, Baton Rouge, La.
[73] Assignee: Kaiser Aluminum & Chemical Corporation, Oakland, Calif.
[21] Appl. No.: 857,644
[22] Filed: Dec. 5, 1977
[51] Int. Cl.² .................................. B24B 15/02
[52] U.S. Cl. ......................... 137/243.2; 251/77; 251/225
[58] Field of Search ............... 137/243–243.5; 251/76, 77; 51/27

[56] References Cited
U.S. PATENT DOCUMENTS

| | | | |
|---|---|---|---|
| 845,458 | 2/1907 | Gilbert | 137/243.2 |
| 1,232,461 | 7/1917 | Eckenroth | 137/243.2 |
| 1,311,954 | 8/1919 | Dally | 137/375 |
| 2,615,465 | 10/1952 | Woodward | 137/243.2 |

*Primary Examiner*—Martin P. Schwadron
*Assistant Examiner*—Richard Gerard

*Attorney, Agent, or Firm*—Paul E. Calrow; Andrew E. Barlay

[57] ABSTRACT

Improved self-grinding valve is provided with corrosion-protecting features and an improved floating coupling between the valve stem and valve disc whereby, when the valve disc is brought into contact with its seat, a selected rotation of the valve disc will produce a grinding of the seat, followed by a disengagement of the valve stem from the valve disc. When this disengagement takes place, the full torque load of the stem can be imposed upon the valve disc to obtain the desired seating of the same. The valve stem is advantageously comprised of improved telescoping and theadedly engaged sections that operate to relieve the forces used to hold the valve disc against the seat upon the initial opening of the valve whereby the amount of torque required to ultimately rotate and free the valve disc from its seat is materially reduced and seizing of the valve disc relative to its seat avoided.

8 Claims, 6 Drawing Figures

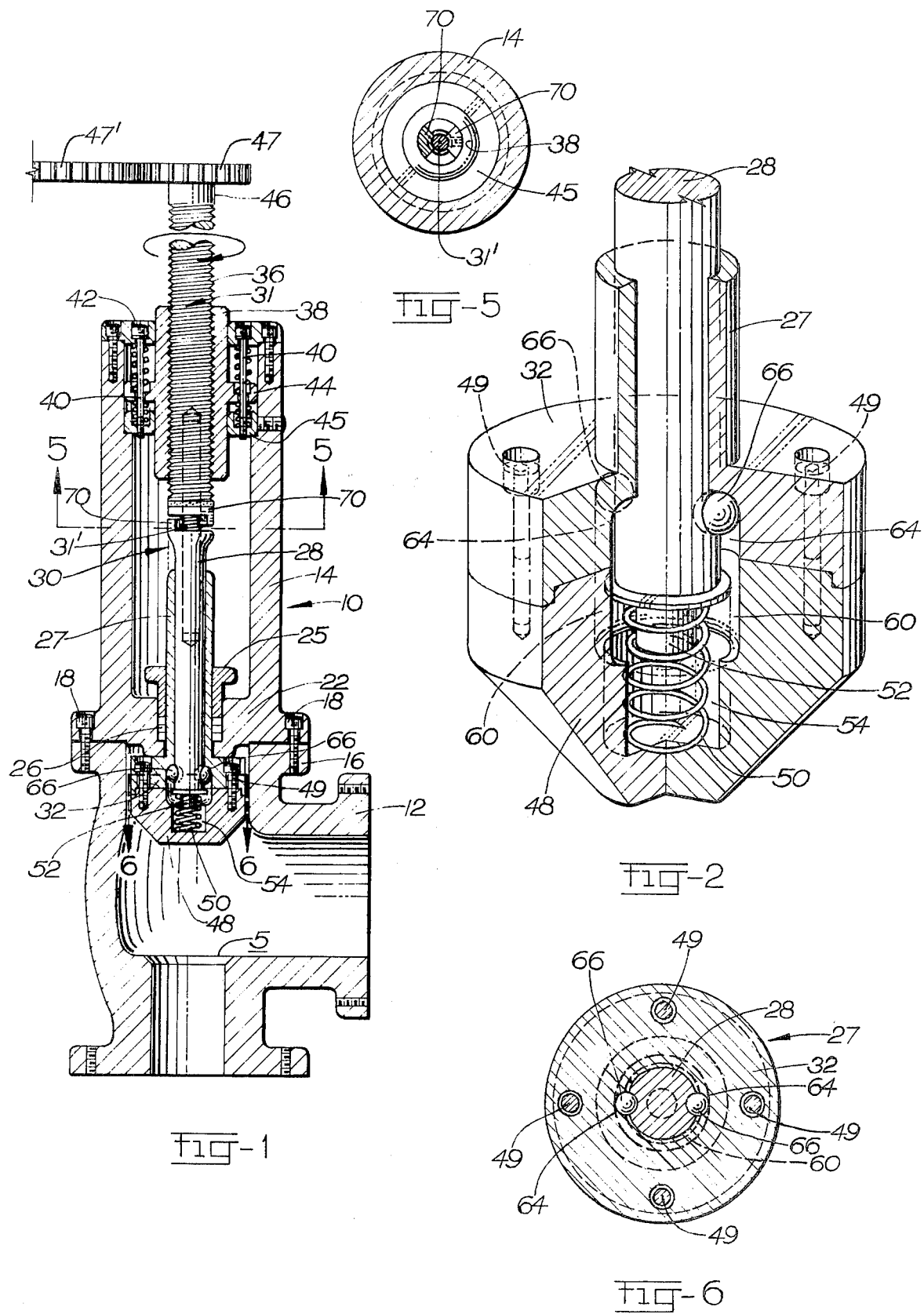

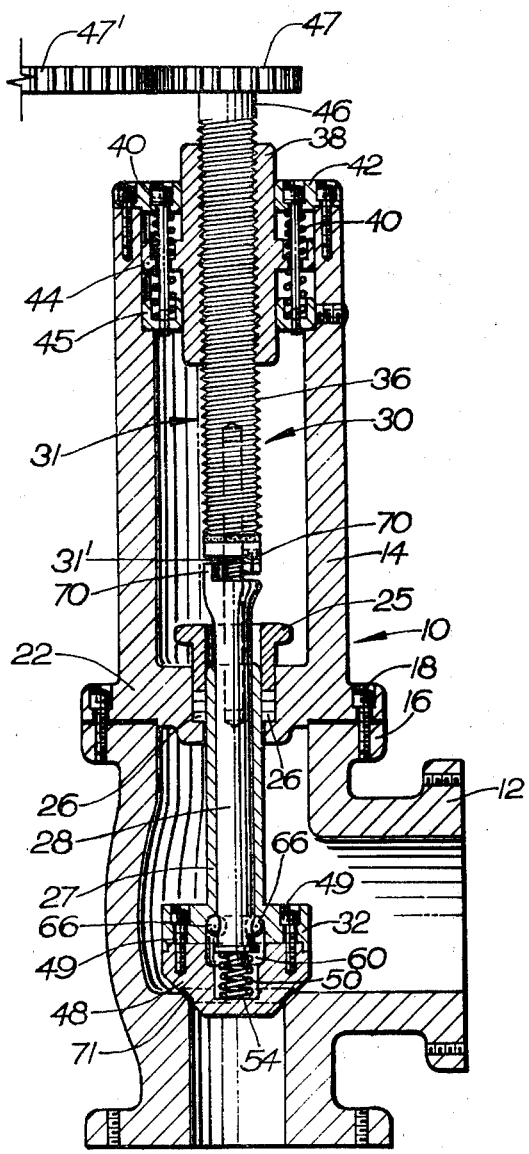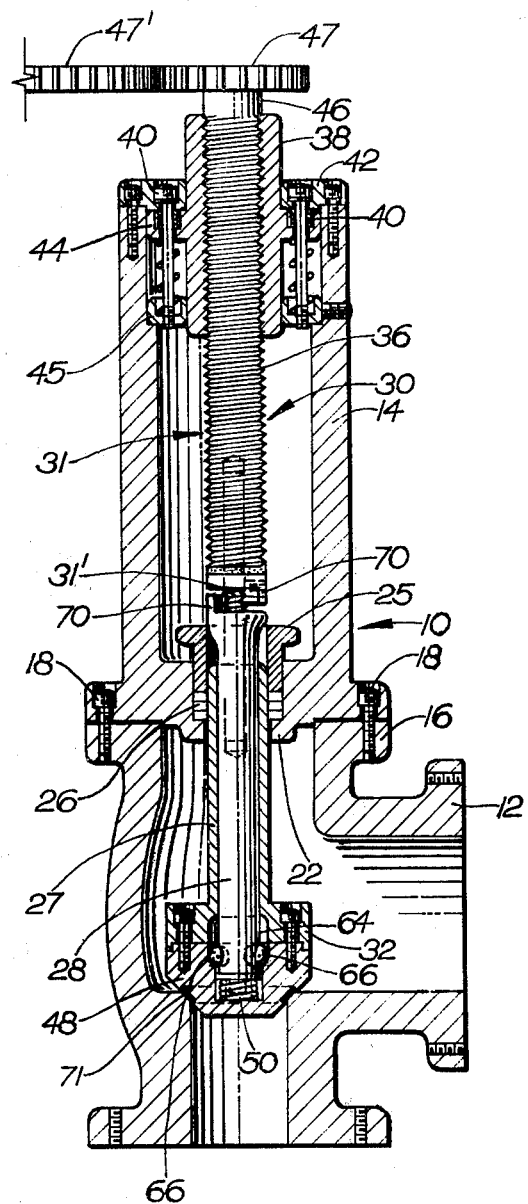

SELF-GRINDING VALVE MECHANISM

BACKGROUND OF THE INVENTION

In the chemical process industry, where corrosive liquids, liquors and/or slurries are treated and transported through various kinds of piping, specially designed valves are employed for controlling the flow of these fluid materials through the piping. Depending on size and material content, a single valve can cost many thousands of dollars. Many of the liquids carried by the piping contain dissolved materials, which, under certain conditions, form scale. Scale formations are highly undesirable in flow control valves because significant amounts of scale buildup on valve seats, as well as around the moving parts of the valve ultimately lead to valve malfunction and failure. Formation of scale in valve seats prevents total closure of the valves with resultant leakage, and this leakage is particularly pronounced when the liquid is under pressure. Scale-encrusted valve discs and other movable valve parts can lead to the freezing of the valve mechanisms and complete operational failure of the valves.

Many attempts have been made in the past to design efficient self-grinding valves, which, either during seating and/or opening, perform seat grinding operations. This grinding action, among other things, cleans the valve seat, allows full seating of the sealing disc and/or allows raising of the scale-encrusted valve discs by freeing the disc from the seat through grinding. The valves described in the following prior art patents are representative of the self-grinding valves developed in the past to accomplish the above-described grinding operations: U.S. Pat. Nos. 1,991,621 (Noll) and 2,996,075 (Deimer, et al.), 3,071,149 (Rhodes), 3,220,431 (Morrell) and 3,311,121 (Morrell). The valves of these patents have not been satisfactory for a number of reasons, such as excessive costs, high maintenance or high torque requirements. U.S. Pat. No. 2,996,075, for example, shows a self-grinding valve wherein a mechanism is provided which allows for a grinding movement or rotation of the valve disc through a rotating valve stem. The nonrotational seating movement is accomplished by locking of the stem against rotation and application of a high closing thrust. The mechanism which controls this selective operation involves a torque converter consisting of a horseshoe-shaped pin which the operator can insert in or remove from the valve stem depending on the type of operation desired. Although the mechanism described provides a valve seat cleaning action, the construction and operation of this type of valve is complicated and no provision is made to protect the internal moving parts of the valve against the corrosive and scaling action of the fluids that contact these valve parts.

U.S. Pat. No. 3,071,149 likewise describes a self-grinding valve, which, while capable of cleaning the valve seat by grinding, fails to provide corrosion protection for the moving parts or the necessary torque required either to close or open the valve. Morrell U.S. Pat. Nos. 3,220,431 and 3,311,121 disclose complex and hard to maintain self-grinding valves wherein the linear movement of the valve stem is effected by a drive means which is separate from the drive means required for the normal rotational or grinding movement of the valve disc.

The valve of the instant invention is believed to constitute a substantial improvement over prior art valves, including those of U.S. Pat. Nos. 1,113,642; 1,551,436 and 1,736,253, in that it is of relatively simple construction, operation and maintenance. It is capable of being readily connected to hydraulic or electric motors. The valve includes a unique arrangement for coupling and uncoupling the valve disc relative to the main valve stem to effect disengagement of the same at the end of the grinding cycle so that the maximum force can be exerted upon this disc for seating purposes.

In the instant design, the principal moving parts of the valve, such as the valve stem and the internal parts of the valve disc are effectively shielded from the scale-forming material being handled so as to noticeably prolong the life of the valve without at the same time decreasing the overall efficiency thereof.

The instant valve is particularly useful in the processing of alumina-containing caustic solutions generated in the Bayer process treatment of bauxite ores wherein these materials are subjected to multiple pumping and valve controlled operations and buildups of hydrated alumina, alkali or silica scale quickly take place on the wetted surfaces of the valves, including, in particular, the valve seats, unless extensive and expensive maintenance practices are employed.

SUMMARY OF THE INVENTION

The instant self-grinding valve is adapted to be readily connected to and powered by a hydraulic motor or the like. It is equipped with an improved segmented stem and an improved coupling between valve stem and grinding disc. Although the ensuing discussion will be concerned with its use, primarily in the processing of liquors generated in the Bayer process treatment of bauxites, it is to be understood that the valve has application in many other processes, particularly where scale formation occurs, as in the production of alkali carbonates and hydroxides, pitch-forming materials, etc. The valve can be of any size, depending upon the results desired, and, while reference will be made during the discussion of the valve structure to its being mechanically connected to a suitable hydraulic motor, it could also be simply manually operated.

BRIEF DESCRIPTION OF THE DRAWING

FIG. 1 is a vertical cross section of the valve of the instant invention showing the valve disc in an unseated and raised position and with the valve stem having been slightly rotated to initiate downward movement just prior to the coupling of the lugs on the stem segments;

FIG. 2 is an enlarged fragmentary perspective view of the valve disc and the lower portion of the segmented valve stem showing how the two are floatingly coupled to each other;

FIG. 3 is a view similar to FIG. 1 with the valve disc being shown in its initial grinding position and with parts added;

FIG. 4 is a view similar to FIGS. 1 and 3 and illustrates how the floating coupling operates to disconnect the valve stem from the valve disc preparatory to the final seating of the valve disc;

FIG. 5 is a sectional view taken along line 5—5 of FIG. 1; and

FIG. 6 is a view generally taken along the line 6—6 of FIG. 1.

DETAILED DESCRIPTION

With further reference to the drawings, and in particular FIGS. 1 and 2, the valve assembly 10 of the instant invention is generally comprised of a main body 12 and a bonnet 14. The bonnet is bolted to flange 16 of valve body 12 through the medium of standard machine screws 18. Bonnet 14 includes a bottom portion 22 provided with a central stepped aperture 24, which is adapted to receive a packing gland 25 and packing 26. Slidingly mounted in gland 25 is a sleeve member 27, and sleeve member 27 surrounds the lower segment 28 of the rotatable valve stem assembly 30 that includes the further upper valve stem segment 31. Sleeve member 27 is fitted with an annular foot or pedestal 32 that can be made integral with the upper part of the sleeve member.

The upper extremity of valve stem segment 28 is interiorly threaded so as to telescopingly receive the small exteriorly threaded spindle portion 31' of the upper stem segment 31. The major portion of upper stem 31 is comprised of the externally threaded section 36, and threaded section 36 fits within the interiorly threaded and flanged thrust bearing collar 38 that is spring-biased in the upper portion of the bonnet 14. Thrust collar 38 is fitted in a manner well known in the art with a series of helical spring assemblies 40 which, in one advantageous embodiment of the invention, bear respectively against the cap 42 of the bonnet 14 and the flange 44 of the thrust collar 38. The downward movements of flange 44 and, in turn, collar 38 are limited by the stop 45 fixedly secured to and within the upper part of bonnet 14. The uppermost extremity 46 of stem segment 31 can be equipped either with a manual operator knob or, as indicated in the drawings, with an appropriate driving gearing 47 that can be connected through a suitable gear train assembly 47' to a hydraulic power source not shown.

With further reference to the drawings, and particularly FIGS. 3 and 4, it will be noted that sleeve 27 advantageously protects stem segment 28 from direct contact with corrosive materials, such as caustic liquors, which pass through the interior of the valve body. This sleeve is of such a length that it will continue to function as a protective shield for stem segment 28, regardless of the various raised or lowered positions assumed by the stem segment 28. A valve disc 48 is suspended from and secured to valve stem pedestal 32 by means of machine screws 49.

Protective sleeve 27 and valve stem segment 28 are resiliently biased relative to valve disc 48 by means of the relatively stiff compression spring 50 which fits about the stub 52 attached to the lower extremity of stem segment 28 and within stepped recess 54 of disc 48 as indicated particularly in FIG. 2. The upper portion 60 of recess 54 constitutes an annular or circumferential ball race or keyways 60 that opens up into and openly communicates at all times with a pair of vertical grooves or keyways 64 in the pedestal or foot 32 of protective sleeve 27. Balls or keys 66 are biased within vertical grooves 64 by compression spring 50 until such time as the extension stub 52 of stem segment 28 acting against spring 50 bottoms in recess 54 as the valve stem assembly 30 moves downward during the final seating of the valve disc 48 in its seat S.

When the final valve disc seating takes place, the balls 66 mounted in stem segment 28 will have cleared their respective vertical grooves or keyways and entered the ball race groove 60 where they are free to circumferentially rotate. This action of the balls 66 results in an uncoupling or disconnection of valve disc 48 relative to stem segment 28 and a discontinuance of further rotational movement of disc 48 even though overall stem assembly 30 may continue to rotate as it moves downward and simultaneously forces valve disc 48 firmly against its seat S.

From the above, it will be seen that the balls 66, along with spring 50, vertical grooves 64 and ball race 60, all cooperate to form a unique floating clutch assembly which advantageously operates to effect a controlled and selective engagement and disengagement of the valve stem assembly from the valve disc during the seating of valve disc 48. The full operation and function of this floating clutch assembly will be described more fully hereinafter. It is to be further understood that, while a preferred embodiment of the invention contemplates that there be at least two balls located 180° apart to stabilize the horizontal and vertical movements of stem assembly 30 relative to valve disc 48, any number of such balls can be used.

In a further advantageous embodiment of the invention, the cooperating sections or extremities of the two different valve stem segments 28 and 31 are provided with opposing lug elements 70. Lug elements 70 are so machined or attached to the respective cooperating valve stem segments that one stem segment can be rotated a small selected amount relative to the other valve stem segment before these lugs make contact and couple the valve stem segments, whereby the valve stem segments will then rotate in the same direction as a unit.

This coupling lug arrangement is of particular importance during the initial opening of the valve because at this time, it acts as an advantageous force-relieving mechanism. That is to say, the momentary free movement or slight selective rotation and upward movement of upper segment 31 by itself brings about an advantageous relaxation of the downward force being applied through stem assembly 30 on the valve disc. As a consequence, the valve stem assembly 30 will be able to rotate relatively easily and freely during the initial opening of the valve because it will not have to overcome the friction caused by the seating force applied by the disc 48 upon the seat S.

Before fully discussing the operation of the improved valve mechanism, a brief description of the function of the compressible spring assemblies 40 interposed between bonnet cap 42 and thrust collar 38 of flange 44 is believed to be in order. The circumferentially disposed spring assemblies 40 operate to apply a selected downward force upon collar 38 which, because of the threaded connection between collar 38 and upper valve stem segment 31, is transferred to the stem assembly 30. This means then during the seat grinding operation, which takes place upon the initial phase of the seating and unseating of the valve disc relative to seat S, that the appropriate force will be applied through the stem assembly to the valve disc in order for the disc to perform an efficient seat grinding operation.

In a further advantageous embodiment of the invention, the stiffness of the springs in spring assemblies 40 and spring 50 are so correlated and adjusted that the combined stiffnesses of all of springs in spring assemblies 40 are not sufficient to overcome the stiffness of the spring 50 in and of themselves.

The operation of the valve mechanism will now be described with reference particularly to FIGS. 1, 3 and 4. Assuming, as indicated in FIG. 1, that valve disc 48 is in its fully raised position, the valve operator first operates the hydraulic power source (not shown) to effect the desired rotation of the upper valve stem 31 through the power train 47' connected to the gear 47 affixed to the upper stem portion 31 of the valve stem assembly 30. The initial rotation of the lower valve stem segment 28 will be slightly delayed until such time as the lug elements 70 on the opposing sections of the valve stem segments 31 and 28 make contact with each other and a full coupling of the same is effected. This slight delay in the rotation of stem segment 28 and the partial rotation of upper stem segment 31 produces the desired relaxing of the closing force on valve disc 48.

As stem assembly 30 moves downward, sleeve 27, along with valve disc 48, will also be carried downward and simultaneously rotated due to the coupling action of balls 66 in the grooves 64, and the biasing action of spring 50 acting against stem segment 28 and disc 48. It is this biasing action that maintains the balls 66 in vertical grooves 64 and the stem segment 28 in a fully extended or expanded condition relative to disc 48 and sleeve 27.

This unitized and combination rotational and downward movement of stem assembly 30, disc 48 and sleeve 27 will continue until the stiffness of spring 50 is fully overcome by the compressive force exerted by valve stem segment 28 on the spring 50 when the stub 52 of stem segment 28 moves down and bottoms in the recess 54 of valve disc 48. The aforesaid bottoming of stub 52 takes place at a selected point of time after the initial contact of the valve disc with seat S and after a selected grinding of the seat has been effected.

When this bottoming of stub 52 takes place, an uncoupling of stem segment 28 and valve disc 48 will occur along with a discontinuation of valve disc rotation and valve seat grinding even though a downward valve disc seating force will continue to be exerted on disc 48. This is all due as noted to the movement of balls 66 into the ball race 60. From the above description, it will be now observed that the functioning of the valve is such that during the initial phase of the valve disc and valve seat contact, an advantageous grinding of the valve seat will always take place due to the positive linkage and coupling of the valve stem with the valve disc.

In the opening of the valve mechanism, however, a reverse type of operation of the aforedescribed elements will take place. The initial rotation of the upper valve segment 31 in an opposite or reverse direction from that used to cause a downward movement of the valve disc will now cause a rotation of the lug element 70 attached to the upper valve stem segment 31 without any corresponding movement of the bottom stem segment 28 until such time as lug elements 70 on both stem segments are fully coupled.

It will also be appreciated, as noted previously, that during this same initial time period, there will be an advantageous relieving of the initial force or a relaxing of pressure upon the seated valve disc so that the rotational movement and full torque of the stem assembly 30 will be used efficiently and not dissipated by having to overcome the friction caused by the closing force of the disc upon the seat at the same time it tries to raise the disc. In other words, the force relief feature, due to the use of the stem lugs 70, means that the initial rotation of the stem segment 31 can free the valve disc from its seat before the seat grinding is initiated. This delayed action also advantageously avoids sticking or freezing of the valve disc with respect to the valve seat, particularly during the initial opening operation and, in turn, puts less strain upon the power train, as well as the driving motor, etc.

As the valve disc 48 moves up, disc biasing compression spring 50 will again come into play and act to force movement of stem segment 28 out of recess 54 and the movement of balls 66 out of race 60 and back into their vertical grooves 64, thereby recoupling disc 48 and stem segment 28 for simultaneous rotational movement and seat grinding.

Continued stem assembly rotation, as noted, will cause valve disc 48 to move upwardly and away from its seat until it is raised to the desired position and is put in an unobstructed position with respect to the flow of the material, such as caustic liquor, through the main valve body.

In a further advantageous embodiment of the invention, the lower portion of disc 48 that contacts the seat S may be equipped with a grinding insert 71 as noted in FIGS. 3 and 4 made from a hard material, such as cobalt based metal alloy sold under the trademark "Sterlite-6" by the Linde Products Company.

From the above, it will be observed that the instant valve mechanism, because of its simplicity in structure and operation, can be advantageously remotely controlled and integrated in a fully computerized processing operation. It requires only a single low speed, high torque motor of conventional design in lieu of the expensive high maintenance equipment currently in use.

Advantageous embodiments of the invention have been shown and described. Various changes and modifications may be made therein without departing from the spirit and scope of the appended claims where:

What is claimed is:

1. In a self-grinding valve mechanism of the type described, the combination of a valve body provided with a valve seat, a valve disc adapted to contact said valve seat upon the closing of the valve mechanism said valve disc being operative during selective contact with the said valve seat to effect a grinding of said seat, means including a valve stem assembly for operating said valve disc to open and close the valve mechanism and to selectively grind said valve seat, means for rotating said valve stem assembly and displacing said valve stem assembly relative to said valve seat, means for floatingly coupling said valve stem assembly to said valve disc to effect a controlled rotation of the valve disc during the grinding of the valve seat including cooperating key and keyway means and means for activating said coupling means including means biasing said key means in the keyway means said biasing means being loaded upon the valve disc engaging said valve seat, whereby upon activation of said coupling means a simultaneous rotation of the valve stem assembly and disc will take place and a grinding of the valve seat effected and wherein said valve stem assembly is segmented and the cooperating opposed portions thereof are provided with coupling lugs selectively spaced with respect to each other so as to provide a delayed coupling and linear displacement of the valve stem segments and relieving the force of said biasing means prior to rotation of the valve disc upon the initial rotation of one of said valve stem segments.

2. The valve mechanism of claim 1 including a thrust bearing collar, means connecting the collar to the valve stem assembly and biasing means for applying a downward force on said collar and in turn on the valve stem assembly and valve disc during the valve seat grinding operation.

3. In a self-grinding valve of the type described, the combination of a valve body provided with a valve seat, a valve disc adapted to contact said valve seat upon the closing of the valve, said valve disc having means operative during contact with the said valve seat for selectively grinding said valve seat, mean including a rotatable valve stem assembly for operating said valve disc to open and close the valve and selectively grind said valve seat, a sleeve means for said valve stem assembly and connected to said valve disc, means for rotating said valve stem assembly, means for floatingly coupling said valve stem assembly to said valve disc to effect a controlled rotation of the valve disc during the grinding of the valve seat including cooperative key means on the valve stem assembly and keyway means in said sleeve means and means for activating said coupling means including means biasing said key means in the keyway means, said biasing means being loaded upon the valve disc engaging said valve seat, and wherein said valve stem assembly is segmented and the cooperating opposed portions thereof are provided with coupling lugs selectively spaced with respect to each other so as to provide a delayed coupling and linear displacement of the valve stem segments and relieving the force of said biasing means prior to rotation of the valve disc upon the initial rotation of one of said valve stem segments.

4. The valve of claim 3 including a thrust bearing collar, means connecting the collar to the valve stem assembly and biasing means for applying a downward force on said collar and in turn on the valve stem assembly and valve disc during the valve seat grinding operation.

5. In a self-grinding valve of the type described, the combination of a valve body provided with a valve seat, a valve disc adapted to contact said valve seat upon the closing of the valve, said valve disc having means operative during contact with the said valve seat for selectively grinding said valve seat, means including a rotatable valve stem assembly for operating said valve disc to open and close the valve and selectively grind said valve seat, means for rotating said valve stem assembly, means for floatingly coupling said valve stem assembly to said disc to effect rotation of the valve disc during the grinding of the valve seat including cooperating key and keyway means and means biasing said key means in the keyway means during activation of said coupling means said biasing means being loaded upon the valve disc engaging said valve seat, and a protective sleeve means connected to and surrounding said valve stem assembly in the area of stem assembly and corrosive material contact and wherein said valve stem assembly is segmented and the cooperating opposed portions thereof are provided with coupling lugs selectively spaced with respect to each other so as to provide a delayed coupling and linear displacement of the valve stem segments and relieving the force of said biasing means prior to rotation of the valve disc upon the initial rotation of one of said valve stem segments.

6. The valve of claim 5 including a thrust bearing collar, means connecting the collar to the valve stem assembly and biasing means for applying a downward force on said collar and in turn on the valve stem assembly and valve disc during the valve seat grinding operation.

7. In a self-grinding valve of the type described, the combination of a valve body provided with a valve seat, a valve disc adapted to contact said valve seat upon the closing of the valve, said valve disc having means operative during contact with the said valve seat for selectively grinding said valve seat, means including a rotatable valve stem assembly for operating said valve disc to open and close the valve and selectively grind said valve seat, means for rotating said valve stem assembly, means floatingly coupling said valve stem assembly to said disc to effect rotation of the valve disc during the grinding of the valve seat including cooperating key and keyway means and means biasing said key means in the keyway means during activation of said coupling means, said biasing means being loaded upon the valve disc engaging said valve seat, and said key means comprising spherical elements and said keyway means comprising grooves and wherein said valve stem assembly is segmented and the cooperating opposed portions thereof are provided with coupling lugs selectively spaced with respect to each other so as to provide a delayed coupling and linear displacement of the valve stem segments and relieving the force of said biasing means prior to rotation of the valve disc upon the initial rotation of one of said valve stem segments.

8. The valve of claim 1 including a thrust bearing collar, means connecting the collar to the valve stem assembly and biasing means for applying a downward force on said collar and in turn on the valve stem assembly and valve disc during the valve seat grinding operation.

* * * * *

UNITED STATES PATENT AND TRADEMARK OFFICE
CERTIFICATE OF CORRECTION

PATENT NO. : 4,177,825

DATED : December 11, 1979

INVENTOR(S) : Millard B. Crawford

It is certified that error appears in the above—identified patent and that said Letters Patent is hereby corrected as shown below:

Column 7, line 16, "cooperative" should be -- cooperating --

Column 8, line 43, "claim 1" should read -- claim 7 --.

Signed and Sealed this

Thirteenth Day of May 1980

[SEAL]

Attest:

SIDNEY A. DIAMOND

Attesting Officer     Commissioner of Patents and Trademarks